United States Patent [19]
Jain et al.

[11] Patent Number: 6,085,101
[45] Date of Patent: *Jul. 4, 2000

[54] COMMUNICATIONS NETWORK HAVING A MULTICAST CAPABILITY

[75] Inventors: Ravi Kumar Jain, Hoboken, N.J.; Michael Kramer, Bronx, N.Y.

[73] Assignee: Telcordia Technologies, Inc., Morristown, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/649,438

[22] Filed: May 17, 1996

[51] Int. Cl.$^7$ ........................................ H04L 12/28
[52] U.S. Cl. ........................ 455/500; 455/503; 455/426; 370/390
[58] Field of Search .................. 455/59, 412, 413, 455/500, 503, 426, 31.2, 31.3; 379/93.01, 93.04, 93.24, 93.17, 88.01, 108.1, 108.2, 93.25; 370/352, 389, 390, 392

[56] References Cited

U.S. PATENT DOCUMENTS

| | | | |
|---|---|---|---|
| 5,193,110 | 3/1993 | Jones et al. | 379/88.1 |
| 5,206,901 | 4/1993 | Harlow et al. | 379/211 |
| 5,224,150 | 6/1993 | Neustein | 455/31.2 |
| 5,297,143 | 3/1994 | Fridrick et al. | 370/86 |
| 5,315,642 | 5/1994 | Fernandez | 379/93.17 |
| 5,396,537 | 3/1995 | Schwendeman | 455/31.3 |
| 5,406,557 | 4/1995 | Baudoin | 370/61 |
| 5,473,667 | 12/1995 | Neustein | 455/31.2 |
| 5,479,411 | 12/1995 | Klein | 379/88.13 |
| 5,493,564 | 2/1996 | Mullan | 370/54 |
| 5,513,126 | 4/1996 | Harkins et al. | 364/514 A |
| 5,604,788 | 2/1997 | Tett | 379/93.24 |
| 5,608,786 | 3/1997 | Gordon | 379/100 |
| 5,646,981 | 7/1997 | Klein | 379/93.24 |
| 5,689,506 | 11/1997 | Chiussi et al. | 370/390 |
| 5,878,230 | 3/1999 | Weber et al. | 379/93.24 |

*Primary Examiner*—Daniel S. Hunter
*Assistant Examiner*—Thuan T. Nguyen
*Attorney, Agent, or Firm*—Joseph Giordano

[57] ABSTRACT

A communications network simultaneously transmits a single message to a number of recipients. This is called a "multicast" transmission. The communications network should have a recipient list database (1302) to receive a list of recipient addresses, a message database (1304) to receive and store the message, and a message delivery system (1306) to send the message to a number of recipients. The communications network may be adapted to collect acknowledgements or responses to a multicast message. If so, the communications network should have a calling record (1308) for storing message delivery information, a response record (1310) for receiving and storing recipient response information, a response processor (1312) for processing the response information, and a response delivery system (1314) for delivering the processed response. The multicast capability may be integrated with other communications network services, such as Personal Location Service, Personal Communications Internetworking, call blocking, etc.

7 Claims, 9 Drawing Sheets

COMMUNICATIONS NETWORK HAVING A MULTICAST CAPABILITY

BACKGROUND OF THE INVENTION

1. Field of the Invention

The present invention relates to communications systems and, more particularly, to transmitting the same message to a number of different recipients, and to collecting and reporting acknowledgements and responses to the message.

2. Discussion of Related Art

Delivering information via wireline or wireless transmission is becoming increasingly common. The information may be in the form of a telephone call, fax, digital video, multimedia, data (such as e-mail), and the like. As seen in FIG. 1, information, such as stock prices, traffic information, weather reports, airline schedules, and sports scores, may be broadcast from a single source, such as a service provider 30 (not unlike a telephone service provider) over a communications network 32 to a number of recipients (users) via wireline and wireless transmission media. The information to be transmitted may be provided by a third party, with the service provider transmitting the information in exchange for a fee. The wireline transmission media may be, for example, a switched communications network, the Internet, or other wireline network. The wireless media may be connected to the wireline transmission media and may be, for example, cellular phone networks or PCS (personal communications services) networks. (A glossary of acronyms is attached as an Appendix.)

A user may be any communications services customer having a communications terminal 34, such as a wireline telephone 34A, fax machine 34B, personal computer 34C, cellular telephone 34D, personal digital assistant (PDA) 34E, or digital video interface device 34F, as is illustrated in FIG. 1. Note that in FIG. 1, wireless communications are indicated with a dashed line.

FIG. 2 is a greatly simplified illustration of a communications network 32. The described communications system is similar to other types of communications networks and is described to provide background to the following discussion of the invention; it is not intended to limit the invention to use with the described communications system. The communications network 32 includes a signaling network 102, which supports a switched communications network. A switched communications network may be, for example, a Public Switched Telephone Network (PSTN) or an Integrated Signaling Digital Network (ISDN). The signaling network 102 is used for exchange of call set-up and other call maintenance information. Once a call is set up via the signaling network, the voice signal is connected over a separate network called a "trunk". The signaling network 102 may be connected to a wireless communications system 104.

An illustrative signaling network 102 includes (among other things) a network database 106, which may be a service control point (SCP). A network server 106, such as an intelligent peripheral (IP), may be connected to the SCP 105. The IP may a Bellcore proprietary Intelligent Services Peripheral. A database called a Home Location Register (HLR) 107 is part of the signaling network. The HLR 107 is connected via link 108 to a Regional Signaling Transfer Point (RSTP) 110. The RSTP 110 is connected via a number of links 112 to several Local Signaling Transfer Points (LSTPs) 114. Each LSTP 114 is connected via a number of local links 116 to a number of switches, such as Service Switching Points (SSP) 118. The SSP 118 connects to customer premises to provide for premises equipment, such as a wireline telephone 34A, fax 34B, or personal computer 34C. An SSP 118 may also connect to one or more Mobile Switching Centers (MSC), Wireless Switching Centers (WSC), or Radio Port Control Units (RPCU) 126, which are part of the wireless communications system 104. The MSC (or WSC or RPCU) 126 is connected to a number of Base Stations (BS) (or Radio Ports (RP)) 128, which monitor a "cell" (or "coverage area") 130. One or more MSC 126 are connected to a second database called the Visiting Location Register (VLR) 132.

The HLR 107 contains a database maintained by a user's local telecommunications service provider at the user's home location. This database includes information about the user, called the user profile. The VLR 132 is maintained by a telecommunications service provider at the location currently visited by a portable device user and portable device, such as cellular telephone 34D or PDA 34E. Either the VLR 132 or the SCP 105 may include a database of user specific information called a Call Processing Record (CPR) 134 (FIG. 2 shows the CPR 134 in the SCP 105). The CPR contains user specified information instructing the communications network how to service that user's incoming communications. The CPR may include, for example, call forwarding, call screening, or call blocking (e.g., "do not disturb") information.

Information services, such as those described in relation to FIG. 1, often send messages containing identical information over dialed communication paths to a number of clients. For example, many clients may commute to work by driving from New Jersey into New York City. These clients may want to know the traffic conditions around the Lincoln Tunnel at 8:30 a.m. Currently, if five hundred clients want this information at the same time, five hundred separate dailed communications must be made. This is inefficient and may be unsuitable for several reasons. First, the volume of transmissions is a burden on the signaling, switching, and trunk resources of the communications network. Second, if the information is time sensitive (such as traffic conditions, stock prices during trading hours, current weather conditions), the information may be "stale" and inaccurate before the five hundredth client is notified.

Current technology does not solve these dialed "transmission of identical messages" problems. Some fax machines, for example, have a broadcast capability. This allows the same facsimile image to be sent to a number of preselected destinations programmed into the fax machine. This saves the sender the trouble of feeding the faxed document into the machine several times. However, the faxes are still transmitted by making separate phone calls. This does not relieve the burden on the communications network or solve the information "staleness" problem.

Some manufacturers have developed special equipment for delivering a single voice call to several recipients. This equipment is installed outside of the communications network. This equipment typically consists of a computer, voice peripheral, and interface cards and is attached to a PSTN switch such as an SSP 118. This equipment, however, places individual, consecutively dialed telephone calls to each recipient. Some PSTN systems provide the client with speed-dialing lists or voice recognition software (which may dial a user's home phone number, for example, by recognizing the spoken words "call home") which may be accessed over the telephone lines. These speed dialing lists save the user the trouble of dialing (or remembering) certain telephone numbers. However, these speed dialing and voice recognition services still place one call at a time. Thus, these services do not relieve the burden on the communications network or solve the information "staleness" problem.

Some voice mail systems which may be installed in a private branch exchange (PBX) allow a single outgoing message to be delivered to a number of voice-mail boxes at one time. This is limited, however, to voice mail boxes within the PBX. The delivery of voice mail to telephone numbers and voice mail boxes outside the PBX require separate, individual telephone calls.

None of these systems provides a way to respond to the message (if a response is requested) other than the conventional transmission (i.e., a return telephone call, fax, e-mail, etc.). For all of these current technologies, the response messages will also use up valuable signaling, switching, and trunk resources. Thus, although these technologies provide some convenience to the sender, they provide little or no convenience to the recipient, and do little or nothing to reduce the burden on the communications network.

The market for information services is large. On the other hand, market research indicates that potential customers may place strict limitations on the amount they are willing to pay for these services.

Therefore, it is an object of the present invention to provide a communications network architecture which efficiently uses network resources for distinct dialed communication paths to send a single message to a plurality of destinations.

It is another object of the present invention to provide a communications network architecture which helps to solve the information "staleness" problem when sending a single message to a plurality of destinations.

It is yet a further object of the present invention to provide a communications network architecture which may send a single message to a plurality of destinations in an economical manner.

It is an even further object of the present invention to provide a method for collecting acknowledgements and/or responses to a number of dialed transmissions of a single message to plural recipients.

SUMMARY OF THE INVENTION

These and other objects are achieved by the present invention. The present invention transmits a single message to a number of recipients. This is called a "multicast" transmission.

In a first preferred embodiment, existing network components are used to receive a message and transmit the message to a number of recipients. Using this communications network architecture, a multicast transmission may be sent as follows:

1. the message provider (user) calls the multicast service;
2. the message provider's call is received at a switch and the call is suspended;
3. the switch queries a network database, which consults the message provider's (or other's) CPR;
4. the CPR instructs the message provider's network server to intercede;
5. the network server queries the message provider and obtains the message and recipient addresses (i.e., telephone numbers, facsimile numbers, and/or e-mail addresses);
6. the network server stores the messages and at that time or a later time contacts some or all of the recipients; and
7. the message is transmitted to the contacted recipients.

In a second preferred embodiment, the communications network uses an existing signaling network, such as an SS7 network, to forward the message to remote recipients. Using this communications network architecture, a multicast transmission may be sent as follows:

1. the message provider calls the multicast service;
2. the message provider's call is received at a switch and the call is suspended;
3. the switch queries a network database, which consults the message provider's (or other's) CPR;
4. the CPR instructs the message provider's network server to intercede;
5. the network server queries the message provider and obtains the message and recipient addresses (i.e., telephone numbers, facsimile numbers, and/or e-mail addresses);
6. the network server stores the messages and at that time or a later time contacts some or all of the local recipients;
7. the network server or network database forwards the message to a remote network server via the signaling network;
8. the remote network server stores the message and at that time or a later time contacts some or all of the remote recipients; and
9. the message is transmitted to the local recipients by the local network server and to the remote recipients by the remote network servers.

In a third preferred embodiment, the communications network uses existing signaling network components to set up a trunk line to deliver the message. Using this communications network architecture, a multicast transmission may be sent as follows:

1. the message provider calls the multicast service;
2. the message provider's call is received at a switch and the call is suspended;
3. the switch queries a network database, which consults the message provider's (or other's) CPR; the CPR instructs the message provider's network server to intercede;
4. the network server queries the message provider and obtains the message and recipient addresses (i.e., telephone numbers, facsimile numbers, and/or e-mail addresses);
5. the network server stores the messages and at that time or a later time contacts some or all of the local recipients;
6. the network server dials a special number to contact either a remote network server or remote network database in order to establish a trunk line between the message provider's switch and the remote recipient's switch;
7. the call is handed over to the remote network database and then to the remote network server;
8. the local and remote network servers (or network server and network database) exchange messages over the trunk, and release the trunk; and
9. the message is transmitted to the local recipients by the local network server and to the remote recipients by the remote network servers.

In a fourth preferred embodiment, separate multicast service nodes are connected to the communications network for handling the multicast capability. The service nodes may be connected to each other by a data network. Using this communications network architecture, a multicast transmission may be sent as follows:

1. the message provider calls the multicast service;
2. the message provider's call is forwarded to a service node;
3. the service node queries the message provider and obtains the message and recipient addresses (i.e., telephone numbers, facsimile numbers, and/or e-mail addresses);
4. the service node stores the messages and simultaneously contacts local recipients;
5. the service node contacts remote service nodes via the data network; the service nodes exchange information; and
6. the message is transmitted to the local recipients via the local service node and to the remote recipients via remote service nodes.

This embodiment may be revised to connect the service nodes directly to switches and to each other. This eliminates the local and remote network servers from the multicast service. This embodiment may also be revised to connect the service nodes to both a switched communications network and a data network.

Any of these embodiments may be adapted to collect acknowledgements or responses to a multicast message. A preferred method of performing this is to create a calling record when a multicast message is sent. The message may be sent with a requested response. The recipient's response is received by the network server or service node and stored in the calling record.

The multicast capability may be integrated with other communications network services. Multicast may be combined with Personal Location Services (described in Jain et al U.S. patent application Ser. No. 08/578,879 now abandoned) or Personal Communications Internetworking (described in Pepe et al. U.S. patent application Ser. No. 08/309,336 now U.S. Pat. No. 5,742,095, Apr. 21, 1998). Multicast may also be modified to handle delivery to recipients with "Do Not Disturb" call blocking or time of day call routing.

BRIEF DESCRIPTION OF THE DRAWINGS

The present invention is described with reference to the following figures.

DETAILED DESCRIPTION OF PREFERRED EMBODIMENTS

Simultaneous Delivery Of One Message To A Plurality of Recipients ("Multicast")

The drawbacks and problems that exist in the related art are solved by simultaneously delivering a message to a number of recipients. This is called a "multicast" transmission.

Figure 1:
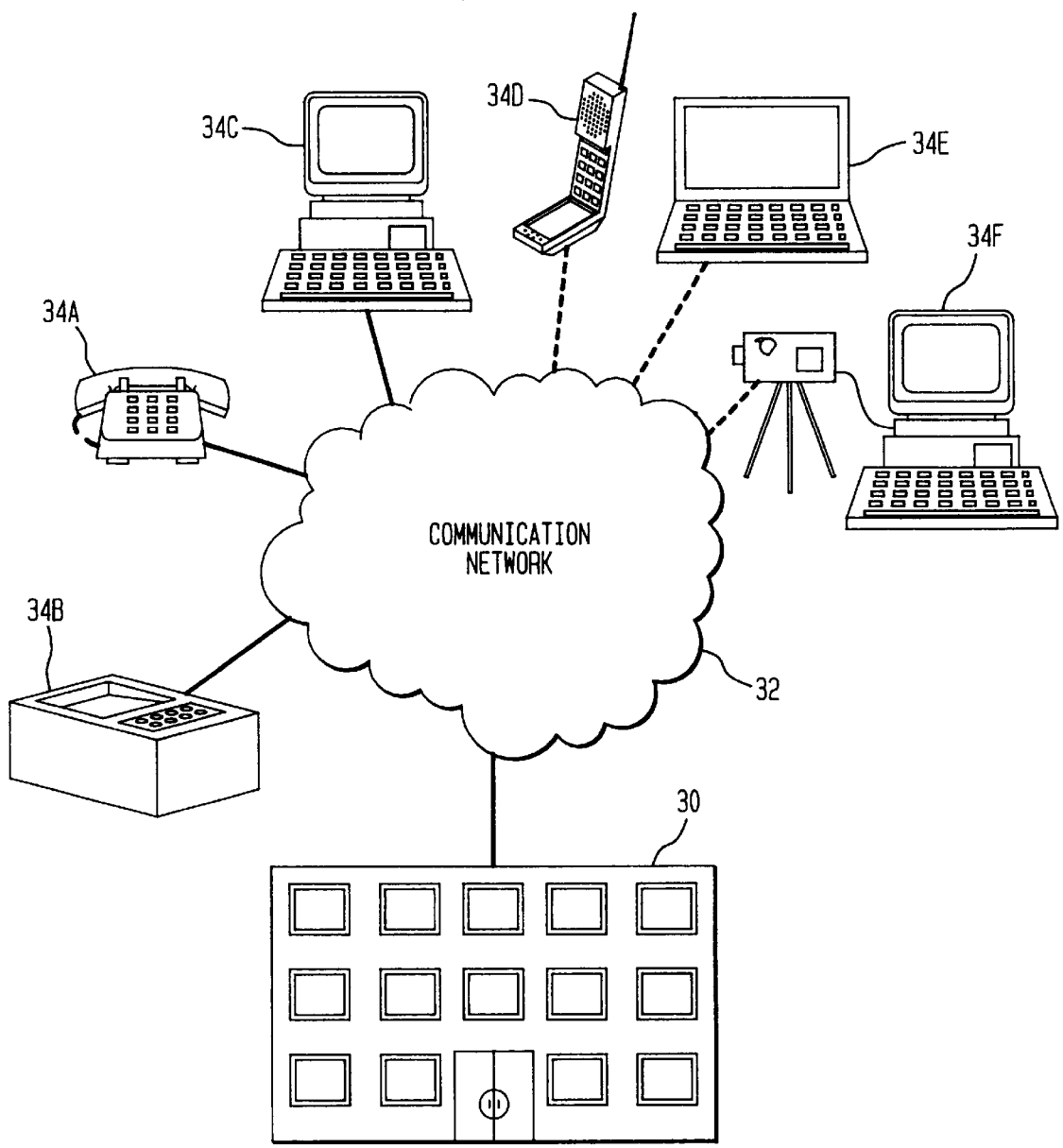
FIG. 1 illustrates a communications network data service.
Figure 2:
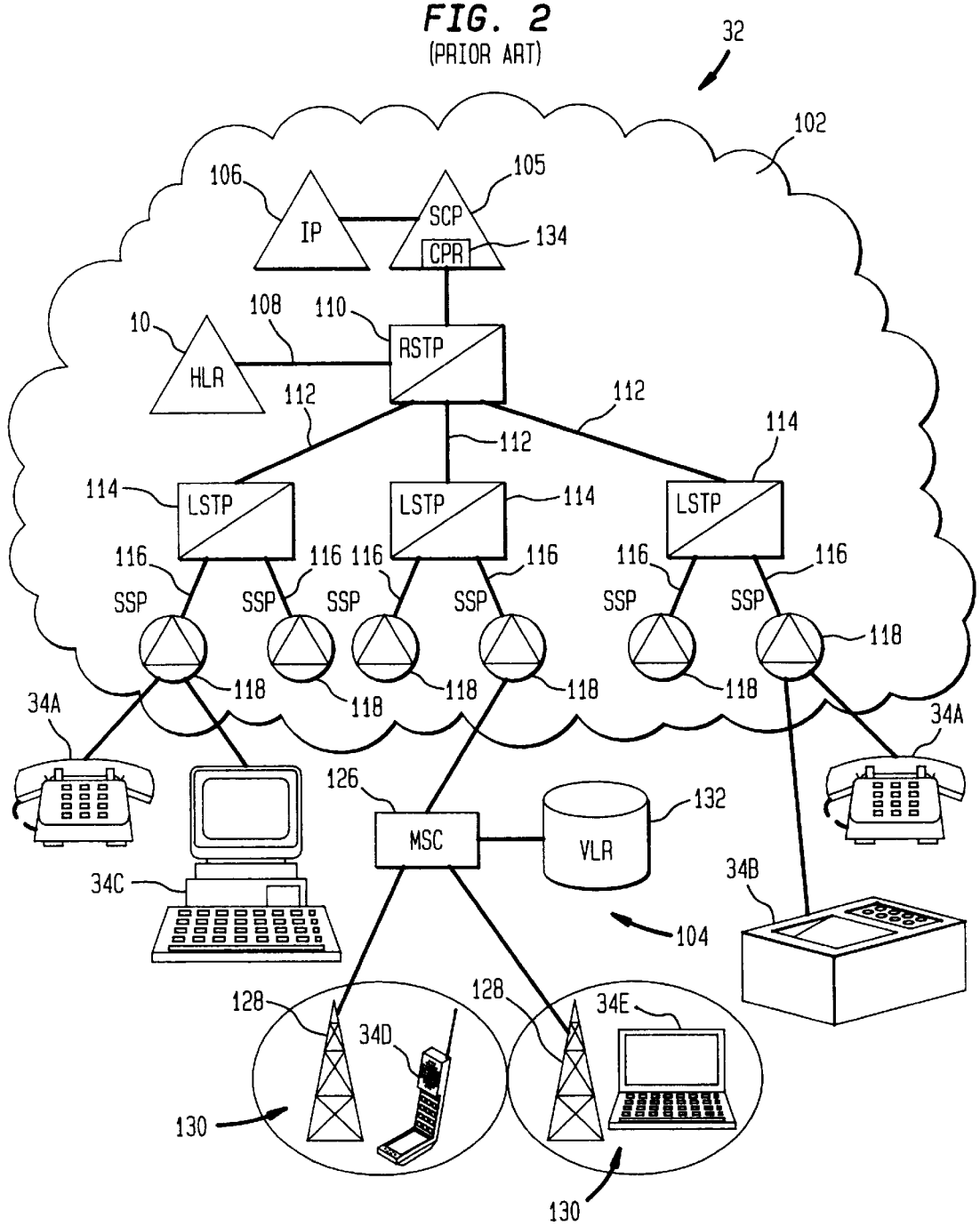
FIG. 2 illustrates a conventional communications network.
Figure 3:
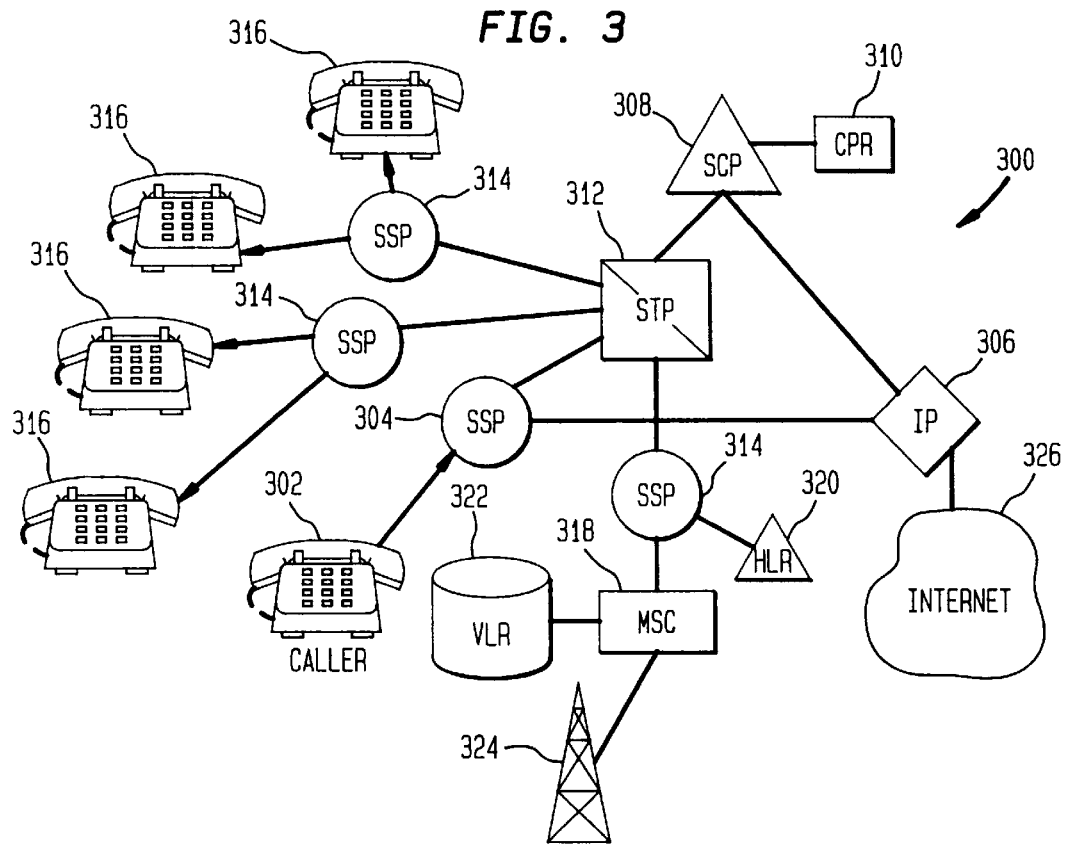
FIG. 3 illustrates a communications network architecture according to a first embodiment according to the present invention.

FIG. 3 is a first preferred communications network architecture 300 according to the present invention. This architecture (and the ones described below) is described with reference to dailed telephone calls, whether for voice or fax transmission. This architecture uses existing communications network components to provide the facilities currently offered by commercially available end-user equipment, such as fax machines with "broadcast" capabilities.

In this embodiment, existing network components are used to receive a message and transmit it to a number of recipients. The architecture 300 includes a sending communications terminal 302, a sending SSP 304 connected to the sending communications terminal, a network server 306 such as an IP, a network database 308, such as an SCP. a CPR 310 connected to the network database 308, and signaling transfer points 312 (for simplicity, FIG. 3 and all subsequent figures collapse the regional and local signaling transfer points into a single component), recipient communications terminals 316, and recipient SSPs 314 connected to the recipient communications terminals. If the recipient communications terminal is a wireless communications device, the recipient SSP is connected to a mobile switching center 318 which connects to a wireless communications network. The wireline communications network includes a VLR 322 and one or more base stations 324. A HLR 320 is connected to the wireline communications network. In this, and the following embodiments, a network server may be connected to other networks 326 such as a data network, the Internet, etc.

In this embodiment, the conventional communications system CPR, IP, and SCP are programmed so that their existing capabilities handle the multicast capability. A message provider may call the multicast service by, for example, dialing a predetermined number (i.e., 1-800-MULTICAST). The call may be routed to a nearby network server 306, such as an IP. The IP may contact an appropriate CPR 310 to create a recipient list. (If a recipient list already exists, the CPR 310 may not be contacted at this time.) A basic multicast service may have one or more dedicated CPRs which anyone may access by dialing the predesignated number. Alternatively, advanced multicast service may require a CPR created for each user. The CPR is modified to accept and store a message delivery list. This list is a directory of recipient addresses, or phone numbers, to which the message is to be delivered. These addresses may be entered into the list using a standard telephone (using DTMF tones or speech recognition), or a computer with a modem. The message provider may specify a list of addresses to be stored in the CPR. The list may be accessed at a later time for sending future messages to the same recipients. In that case, the message provider need only enter the new message, and the system uses the stored list of addresses to deliver the message. The message provider may also retrieve the list of stored addresses, and delete or add numbers to it, using a standard telephone, or a computer with a modem.

The CPR may be programmed to allow a message provider to store a number of different lists. In this case, the addresses or, phone numbers, may be entered using a standard telephone, using identifiers that may be as simple as a single number (i.e., "1" to specify list #1, "2" for list #2, etc.) or spelled-out names (i.e., S-A-L-E-S, B-A-N-K-S) entered from the telephone keypad. Once multiple lists have been created, the user may be able to specify a list of recipients to receive a particular message. The user may also edit the lists as desired. Preferably, the stored list of addresses may be accessed from any phone line within the PSTN by dialing the special number for the multicast service (i.e., 1-800-MULTICAST). Thus, for example, a company could set up a centralized list of phone or fax numbers of its sales representatives, and allow that list to be used from anywhere in the country (i.e., other branch offices, store outlets, etc.).

Security against unauthorized access to the lists is possible. For example, lists may be password or personal identification number (PIN) protected in the same way that automated banking accounts are, for example. Another example may be permitting access to lists only from a particular phone number. This may be accomplished using "caller ID" technology, where the list may be accessed where the telephone number from which the call is originating matches the authorized phone number (or numbers).

The IP 306 may be programmed to receive a number of destinations for a single incoming message. The IP is programmed to allow the IP to request the user to enter a list of destinations, and to receive and record the list. Alternatively (or in addition), the IP 306 may receive the list of destinations from the CPR 310. The IP then connects the message to one or more outgoing lines at the same time. The call connections may be made in the usual manner. The message provider may then instruct the system to deliver the information immediately. Alternatively, the message provider may specify that the message be sent to all or some of the recipients at a later time (i.e., to take advantage of lower toll charges or to send the message to a different time zone). Note that the IP is not required to handle capabilities not already performed by existing IPs.

The message delivery time can be entered using a standard telephone or a computer. The IP may be programmed to store the message and recipients' addresses until the designated time before sending the message. Some calls may be made at one time and other calls may be made at others. For example, if a multicast message is to be made to area codes in different time zones, the multicast service may be programmed to deliver a message at a particular time in the time zone. A multicast message provider may request that a message be delivered at 9:00 a.m. in the time zone in which the message will be received. If the message provider is calling from New Jersey at 8:00 a.m., the message will be stored and the recipient area codes will be checked against a time zone/area code database. Calls to New York City (212 area code), Atlanta (404), and Miami (305) will be made one hour after the message is provided. Calls to Chicago (312) and Kansas City (816) will be made two hours after the message is provided. Calls to Los Angeles (213) and Seattle (206) will be made four hours after the message is provided.

The SCP 308 may be programmed to receive and handle calls requesting the multicast service. The SCP is not required to handle capabilities not already performed by existing SCPs.

Figure 4:
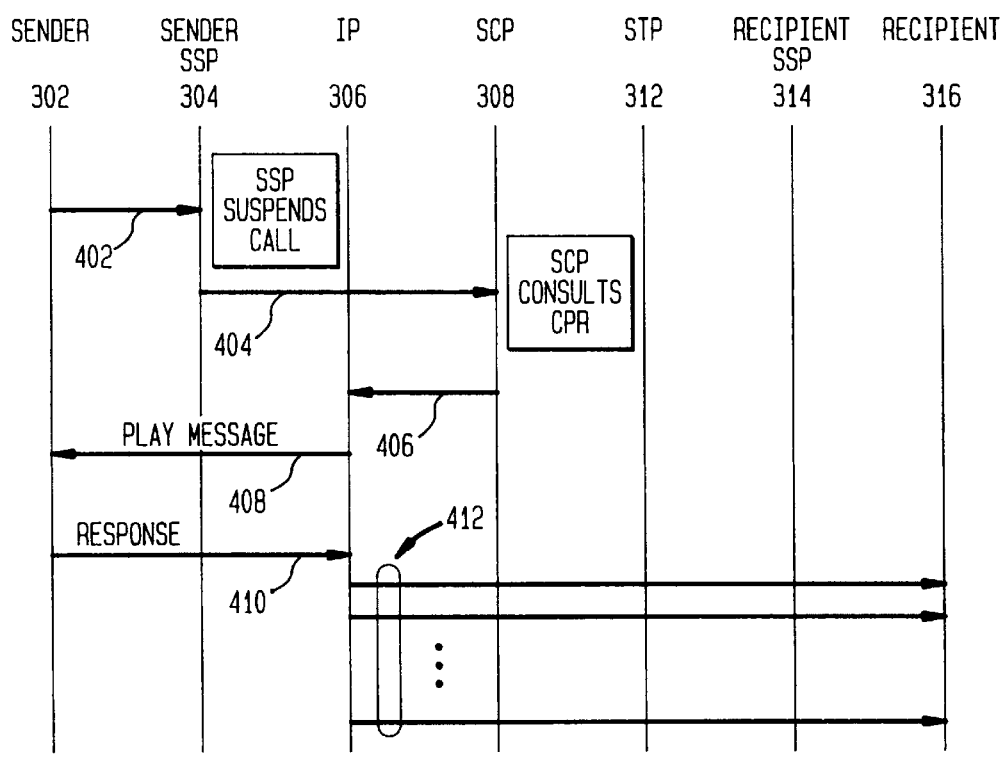
FIG. 4 is a call flow diagram for the communications network of FIG. 3.

FIG. 4 is a call flow 400 which may be performed by the architecture of FIG. 3. The call flow may be modified in a manner well known to those skilled in the art to deliver fax, data, video, or other type of communications, as well. A multicast transmission of a single message preferably occurs in the following manner.

1. The message provider contacts the multicast service by, for example, dialing a number provided for the multicast service.
2. The message provider's call is received (line 402) at the SSP 304. The SSP 304 suspends the call.
3. The SSP 304 queries the SCP 306 (line 404).
4. The SCP 306 consults the appropriate CPR 310 (e.g., either generic or user-specific), which instructs the IP 306 to intercede (line 406).
5. The IP 306 plays an announcement such as "Enter destination numbers and message" (line 408).
6. The message provider enters the message, recipient address list (either a new list or refers to an existing list in the CPR), and other requested information in an appropriate manner (line 410). For example, information may be punched on a telephone key pad using DTMF signals, typed on a keyboard, or spoken (if the communications network has speech recognition capability).
7. The IP 306 stores the message and places calls to the indicated recipients (line 412).
8. The recipients receive the message.

If the network server 306 is connected to additional networks 326, such as the Internet, the recipient list may include addresses in different formats, such as telephone numbers, facsimile numbers, or e-mail addresses. Thus, the same message may be delivered to a first recipient as a facsimile transmission over the PSTN and to a second recipient as an e-mail over the Internet. A format conversion may be performed for this service. These types of format conversions are well known in the art. Thus, a telephone message may be converted into text by a speech recognition device. The text may then be transmitted as data (i.e., e-mail) or converted into facsimile format for transmission. An e-mail message may be converted into a voice message using a speech synthesizer. These format conversions may be performed in all of the following embodiments.

Figure 5:
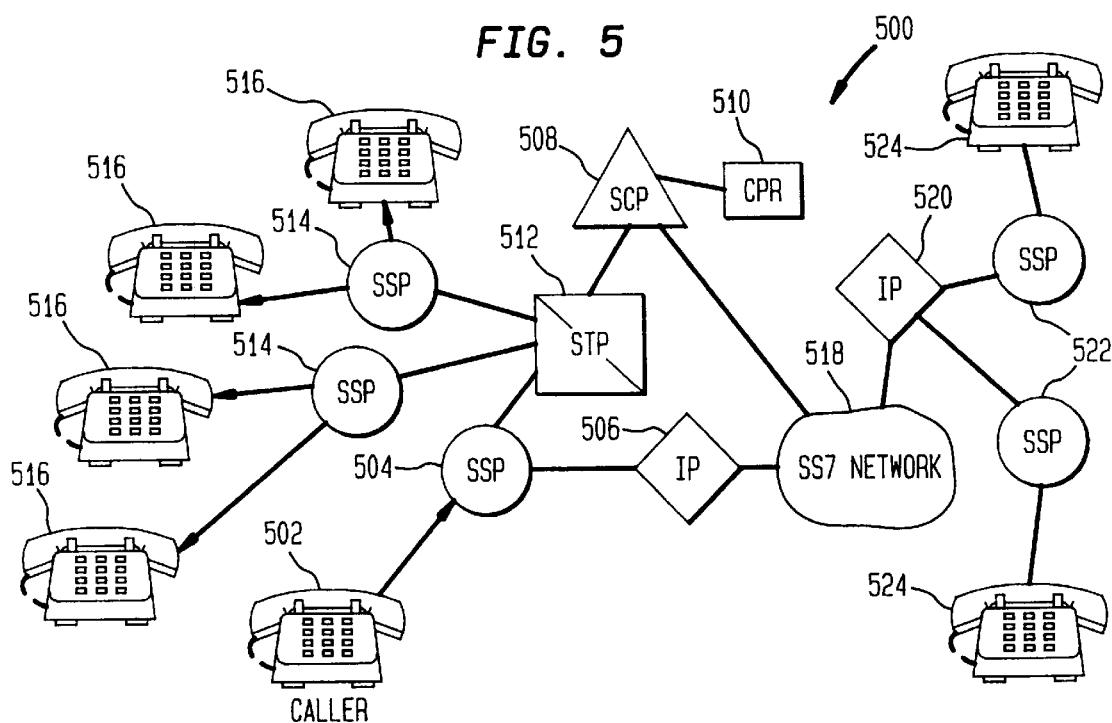
FIG. 5 illustrates a communications network architecture according to a second embodiment of the present invention.

FIG. 5 is a second preferred communications network architecture 500 according to the present invention. The embodiment uses existing signaling components to transmit the message to remote recipients. The architecture 500 includes a sending communications terminal 502, a sending SSP 504 connected to the sending communications terminal, a network server 506 such as an IP, a network database 508 such as an SCP, a CPR 510 installed in the network database, signaling transfer points 512, local SSPs 514, and local recipient terminals 516. The communications network 500 also includes an SS7 signaling network 518 for connection to a remote network server 520, such as an IP, remote SSPs 522, and remote recipient communications terminals 524.

Figure 6:
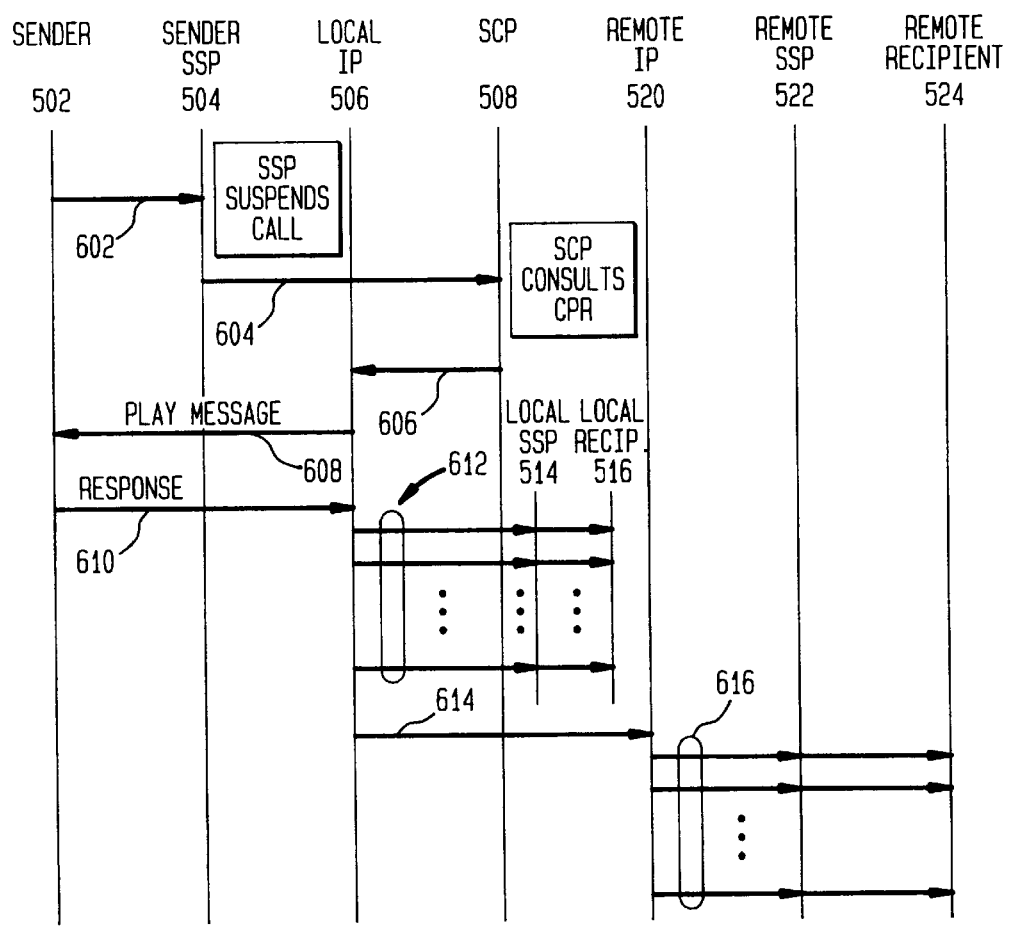
FIG. 6 is a call flow diagram for the communications network of FIG. 5.

FIG. 6 is a call flow 600 which may be used with the architecture of FIG. 5. The call flow may be modified in a manner well known to those skilled in the art to deliver fax, data, video, or other type of communications, as well. A multicast transmission of a single message preferably occurs in the following manner.

1. The message provider calls the multicast service by, for example, dialing a number provided for a multicast service.
2. The message provider's call is received (line 602) at the SSP 504. The SSP 504 suspends the call.

3. The SSP 504 queries the SCP 508 (line 604).
4. The SCP 508 consults the appropriate CPR 510 (e.g., either generic or user-specific), which instructs the IP 506 to intercede (line 606).
5. The IP 506 plays an announcement such as "Enter destination numbers and message" (line 608).
6. The message provider enters the message, recipient address list (or refer to an existing list in the CPR), and other requested information in an appropriate manner (line 610).
7. The IP 506 stores the message and places calls to the indicated local recipients (line 612).
8. Either the local IP 506 or SCP 508 forwards the message to remote IPs 520 via the SS7 network 518 (line 614).
9. The remote IP 520 stores the message and places calls to the indicated remote recipients (line 616).
10. The local and remote recipients receive the message.

This architecture 500 uses the existing SS7 signaling network 518 to deliver the message to remote recipients via remote IPs in the network. The remote IPs deliver the message to destinations connected to a nearby SSP. This architecture 500 may require augmenting the SS7 protocol (such as the Transaction Capabilities Application Part, or TCAP) with appropriate messages. The augmentations to be made are obvious to a person skilled in the art and are not discussed further. The choice and delivery of the user message to the remote SSP may be coordinated by the SCP 508 or by the local IP 506. After collecting the message and list of destination numbers, the local IP 506 may forward this information to the local SCP 508, which may then contact the local and remote IPs 506, 520, or the local IP 506 may directly contact the (appropriate) remote IPs.

The SS7 network 518 has typically been used only for sending signaling information such as call set up or associated signaling. It has not been used for sending user messages, which are typically sent on the voice trunk. It may not be practical or desirable to use the SS7 network to provide such a capability.

Figure 7:
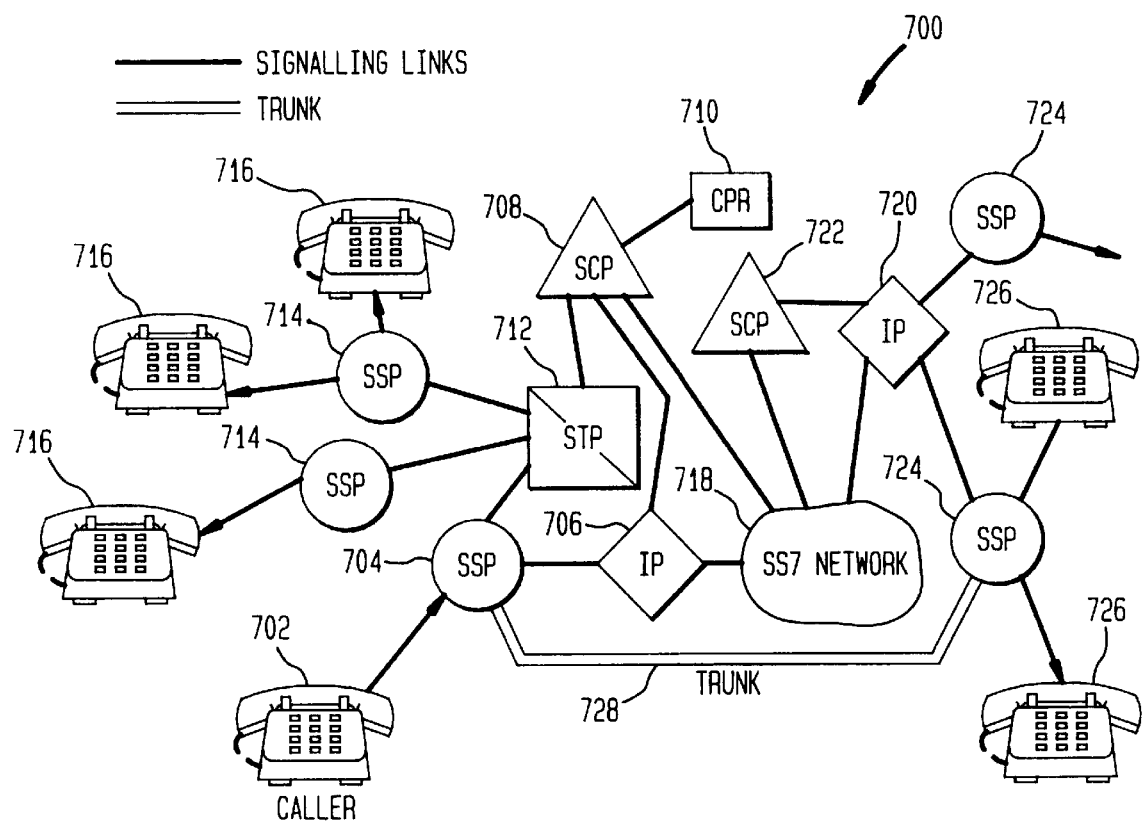
FIG. 7 illustrates a communications network architecture according to a third embodiment of the present invention.

FIG. 7 is a third preferred communications network architecture 700 according to the present invention. This embodiment uses existing network components to set up a trunk line to deliver the message to remote recipients. The architecture 700 includes a sending communications terminal 702, a sending SSP 704 connected to the sending communications terminal, a network server 706 such as an IP, a network database 708 such as an SCP, a CPR 710 installed in the network database, signaling transfer points 712, local SSPs 714, and local recipient terminals 716. The communications network 700 also includes an SS7 signaling network 718, the signaling network connects to a remote network server 720, such as an IP, a remote network database 722, such as an SCP, remote SSPs 724, and remote recipient communications terminals 726 (for clarity, only one remote SSP 724 is shown). A trunk line 728 is directly or indirectly connected between the message provider's SSP 704 and the remote SSP 724.

Figure 8:
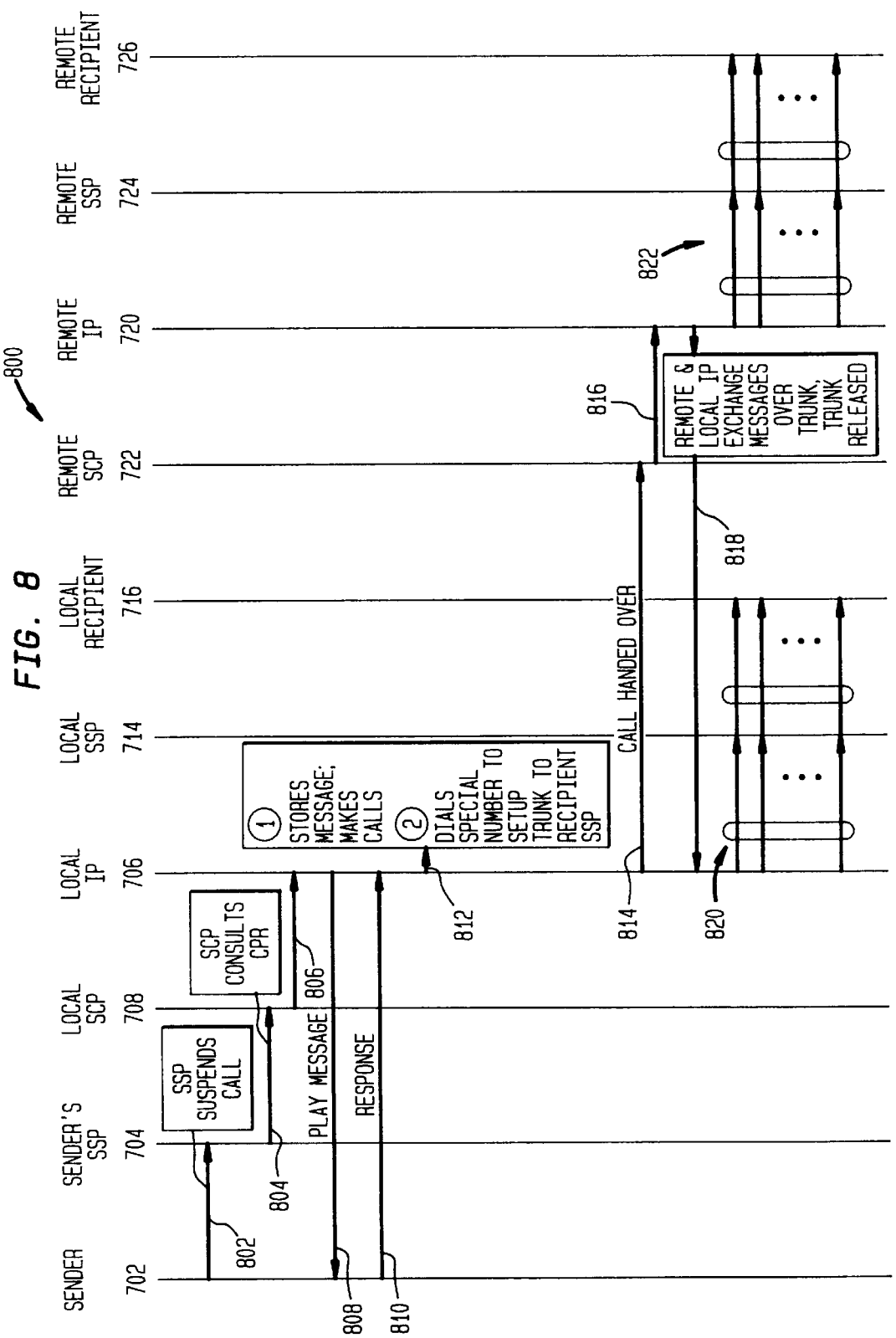
FIG. 8 is a call flow diagram for the communications network of FIG. 7.

FIG. 8 is a call flow 800 which may be used with the architecture of FIG. 7. The call flow may be modified in a manner well known to those skilled in the art to deliver fax, data, video, or other type of communications, as well. A multicast transmission of a single message preferably occurs in the following manner.

1. The message provider calls the multicast service by, for example, dialing a number provided for a multicast service.

2. The message provider's call is received (line 802) at the SSP 704. The SSP 704 suspends the call.
3. The SSP 704 queries the SCP 708 (line 804).
4. The SCP 708 consults the appropriate CPR 710 (e.g., either generic or user-specific), which instructs the IP 706 to intercede (line 806).
5. The IP 706 plays an announcement such as "Enter destination numbers and message" (line 808).
6. The message provider enters the message, recipient address list (or refers to an existing list in the CPR), and other requested information in an appropriate manner (line 810).
7. The IP 706 stores the message and places calls to the indicated local recipients (line 812). At the same time, the local IP 706 dials a special number to contact either the remote IP 720 or remote SCP 722 in order to establish a trunk line between the message provider's SSP 704 and the remote SSP 724.
8. The local IP's call is handed over to the remote SCP 722 (line 814) and then to the remote IP 720 (line 816).
9. The local and remote IPs 706, 720 exchange messages over the trunk 728 using voice-band modems, and release the trunk (line 818).
10. The local and remote recipients receive the message (lines 820, 822).

This architecture 700 does not use the SS7 network to transmit the message. Rather, the architecture uses the switched communications network trunking facilities (e.g., trunk line 728) to deliver the message between remote SSPs. Once the local IP 706 has collected the user message and destination numbers, as before, it contacts a remote IP 720 for more efficient delivery. The IP makes a regular "POTS" (plain old telephone service) call to a special number. The special number is served by an SSP 722 near the remote IP. The dialed number triggers the message provider's SSP 704, which suspends the call, and queries the message provider's SCP 708 for instructions. The SCP 708 instructs the remote IP 720 to intercede. The local and remote IPs 706, 720 exchange the desired information over the voice trunk (i.e., using voice-band modems). The message provider's IP 704 delivers the message to the remote recipients via the voice trunk 726.

Figure 9:
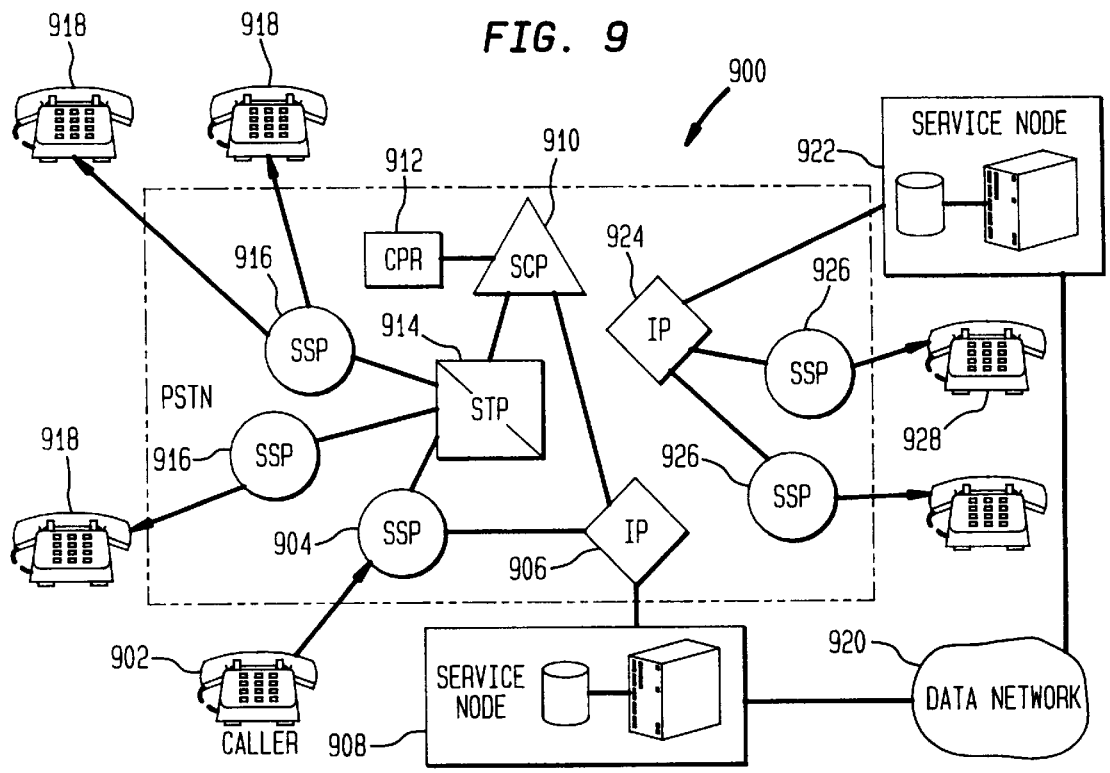
FIG. 9 illustrates a communications network architecture according to a fourth embodiment of the present invention.

FIG. 9 is a fourth preferred communications network architecture 900 according to the present invention. This embodiment provides dedicated components called service nodes to handle the multicast capability. These service nodes may be connected to communications network components and may be connected to each other by a data network. The architecture 900 includes a sending communications terminal 902, a sending SSP 904 connected to the sending communications terminal, a network server 906 such as an IP, a local service node 908 connected to the local IP, a network database 910 such as an SCP, a CPR 912 installed in the network database, signaling transfer points 914, local SSPs 916, and local recipient terminals 918.

The service node 908 is preferably a database containing multicast information, such as distribution lists, telephone numbers, facsimile numbers, and e-mail addresses, billing information, and the like. The service node may be a computer (such as an off-the-shelf PC) or other communications network serving device. The communications network 900 also includes a data network 920, such as a private data network, a public data network (e.g., the Internet), or a number of leased lines. The data network 920 connects to a remote service node 922, a remote network server 924, such as an IP, remote SSPs 926, and recipient communications terminals 928.

Figure 10:
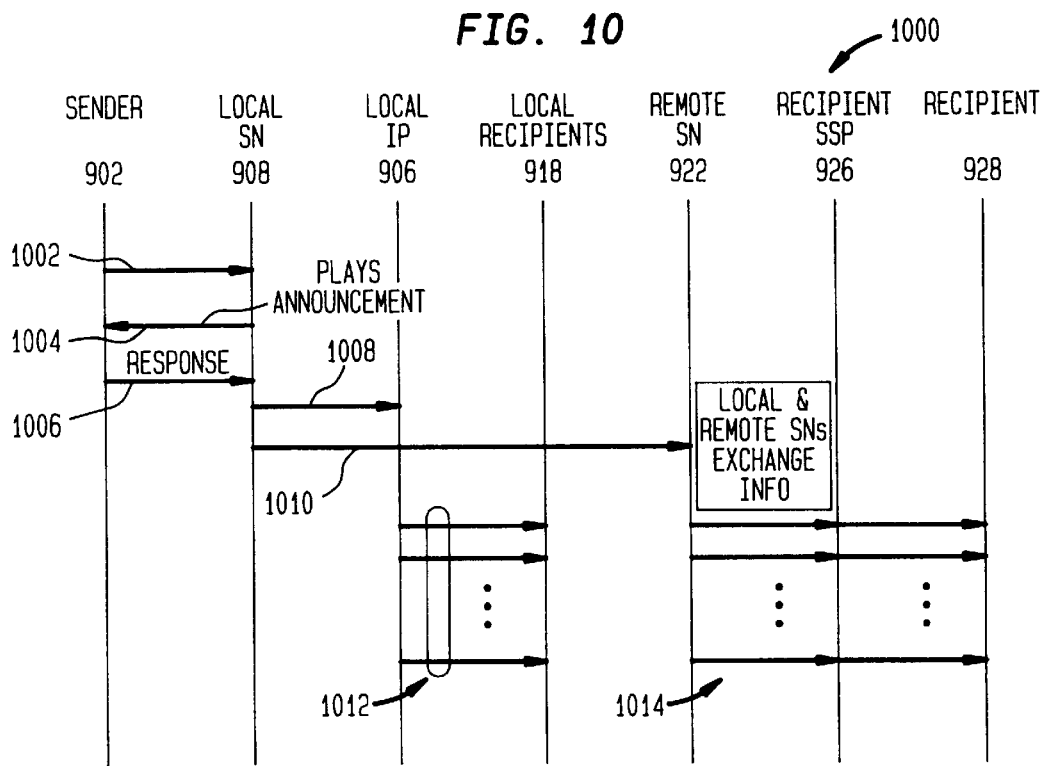
FIG. 10 is a call flow diagram for the communications network of FIG. 9.

FIG. 10 is a call flow 1000 which may be used with the architecture of FIG. 9. The call flow may be modified in a manner well known to those skilled in the art to deliver fax, data, video, or other type of communications, as well. A multicast transmission of a single message preferably occurs in the following manner.

1. The message provider calls the multicast service by, for example, dialing a number provided for a multicast service. This number may connect the message provider to the service node 908 (line 1002).
2. The service node plays an announcement such as "Enter destination numbers and message" (line 1004).
3. The message provider enters the message, recipient address list, and other requested information in an appropriate manner (line 1006).
4. The service node 908 stores the message and simultaneously places calls to the indicated local recipients via the IP 906 (line 1008).
5. At the same time, the local service node 908 contacts a remote service node 922 via a data network 920 (line 1010). The service nodes 908, 922 exchange user message and destination information.
6. The local and remote recipients receive the message (lines 1012, 1014). If the message is a voice or fax message, it is delivered over ordinary telephone lines.

Data messages may be delivered over data networks, such as the Internet.

This architecture is an "open" implementation. This is because the primary service logic and functionality do not reside in the communications network elements, but in service nodes 908, 922 connected to the IPs 906, 924. An advantage of this architecture 900 is low entry cost, because the service node hardware may be low-cost off-the-shelf PCs. This avoids the time and expense of reprogramming each of the existing network IPs to handle the multicast capability.

Figure 11:
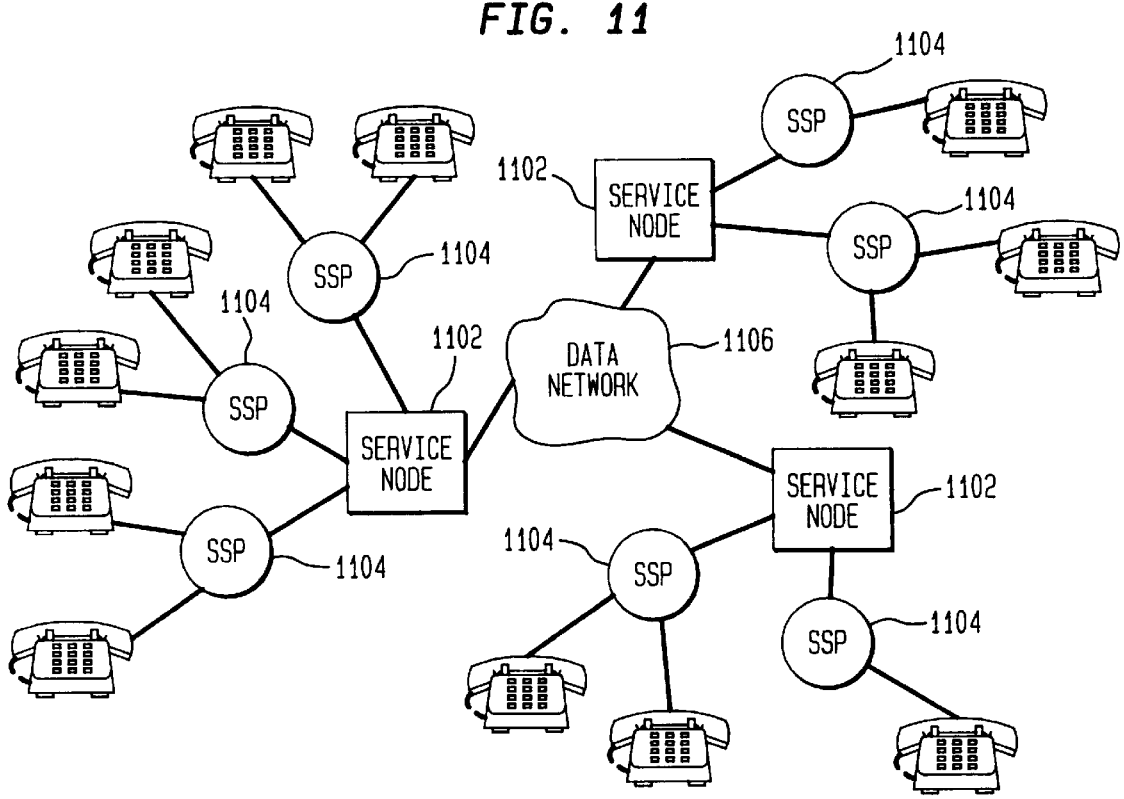
FIG. 11 illustrates a communications network architecture according to a fifth embodiment of the present invention.

FIG. 11 is an alternative architecture 1100 to the architecture of FIG. 9. In FIG. 11, the service nodes 1102 are directly connected to SSPs 1104. The service nodes 1102 are also connected to each other via a data network 1106. The data network 1106 may be, for example, a PSTN trunk, a public data network (e.g., the Internet), or private leased lines. The service node obtaining the message provider's multicast message and address list does not communicate with an IP to make calls. Instead, the message is sent between service nodes. Each service node sends the message to recipients as ordinary telephone calls using regular telephone access lines.

Figure 12:
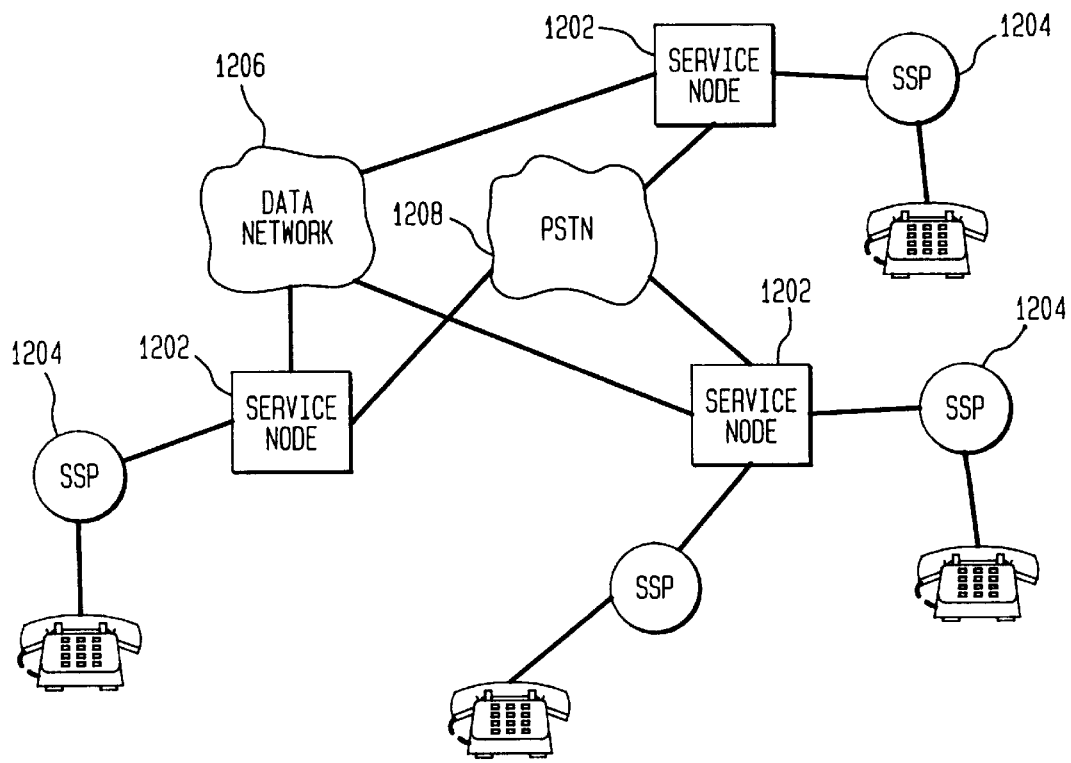
FIG. 12 illustrates a communications network architecture according to a sixth embodiment of the present invention.

FIG. 12 is a second alternative architecture 1200 to the architecture of FIG. 9. As seen in FIG. 12, the service nodes 1202 are directly connected to SSPs 1204. The service nodes 1202 are also connected to each other via both a data network 1206 and a switched communications network 1208, such as PSTN. The service node obtaining the message provider's multicast message and recipient list does not communicate with an IP to make calls. Instead, the messages are transmitted in the same manner as described above in relation to FIG. 10. However, the recipient list may include telephone numbers, facsimile numbers, or e-mail addresses. Thus, the same message may be delivered to a first recipient as a fax transmission (perhaps based on a delivery preference stored in the service node) over the PSTN and to a second recipient as an e-mail over the Internet.

These embodiments describe preferred structures and methods for delivering a message to a number of recipients. These embodiments solve the information "staleness" problem because the recipients are receiving the message relatively simultaneously. These embodiments also efficiently use network resources because a single call is made between the message provider and the network components. The network components then make the calls simultaneously, rather than making them one after the other, which ties up the component for a longer amount of time.

Collecting and Returning Responses To a Multicast

The embodiments above do not address the efficient use of network resources to collect and deliver responses to a multicast message.

In some cases it may be helpful for the multicast message provider to receive an acknowledgement that the message was received by the intended recipient and, if not, an indication of those recipients who did not receive the message. It may also be useful for the message provider to receive a reply to the message. For example, a pollster may desire promptly returned responses to a survey. Another example may be telemarketers who may be required to provide an option for recipients to block delivery of any future telemarketing messages. Another example may be for event organizers to receive an RSVP to know whether or not the recipient will attend the event.

This response may be provided for any of the communications media and any architecture described above. A voice multicast message using the architecture of FIG. 3 is described for illustration. Referring to FIG. 3, when the IP 306 begins to make the voice calls to deliver the multicast message to each recipient, the IP creates a calling record containing the phone number, facsimile number, or e-mail address of each recipient it calls. At some point in the message (preferably the end) the IP provides an announcement (for example, a voice message "Press 1 or say yes to confirm that you will attend this meeting" or a text message requesting that the recipient click a "Yes, I will attend" or "No, I will not attend" button), and waits for the recipient's response. The response to a voice message may be collected as DTMF tones from the recipient's keypad or by speech recognition using well-known techniques, and stored in the calling record of the recipient. A text response may be collected in the ordinary manner.

Figure 13:
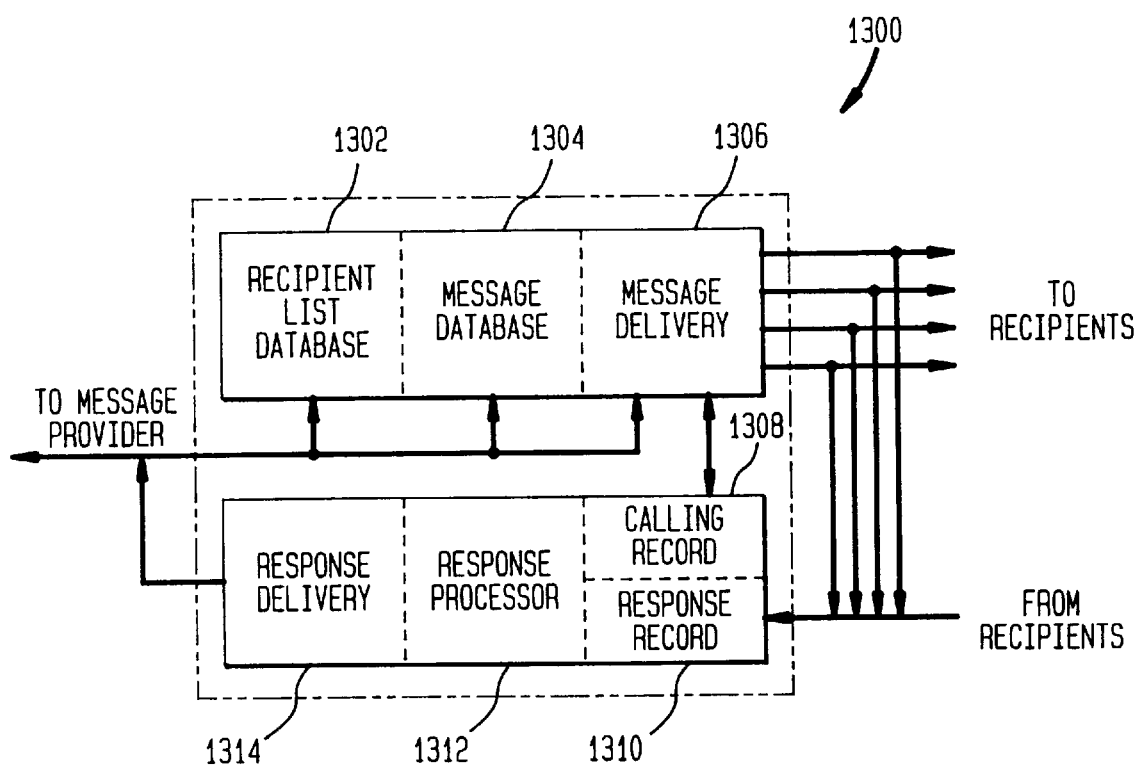
FIG. 13 is a block diagram of a network component according to the present invention.

The calling records of all the recipients may be processed at an SCP, IP, or other network processing entity and returned to the message provider using relatively simple to program software. FIG. 13 illustrates such a network processing element 1300. This element may be a single physical or logical network component or several network components operating together. The element has a recipient list database 1302, a message database 1304, a message delivery system 1306, a calling record 1308, a response record 1310, a response processor 1312, and a response delivery system 1312.

The recipient list database 1302 receives the recipient addresses from the message sender (or receives a predefined list from the CPR). The message database 1304 receives and stores the message from the message provider. The message delivery system 1306 sends the stored message to the recipients in the stored list.

The calling record 1308 maintains information about message delivery, such as which recipients have received the message. A response record 1310 is connected to the calling record and maintains responses received from the recipients. The response processor 1312 receives the responses from the response record 1310. The response records may be processed in any number of ways, depending on the message provider's preference. For example, the responses may be returned individually (i.e., called number and "yes" or "no"

response) or filtered to return only the ones with a certain response (i.e., those recipient's who pressed "1"), or a statistical result could be returned (i.e., 98% of recipients responded with "yes").

The (processed) calling records can be returned to the message provider by the response delivery system 1312 via a number of media, i.e., via fax, phone call, voice mail, e-mail, etc., depending on the user preferences stored in the CPR. The calling records can be converted to the appropriate medium (i.e., text, fax, or voice) using well-known techniques.

Although this description is for a voice message, responses could also be collected for data messages sent to recipients' computers, if the computers have been loaded with appropriate software for returning such responses. For example, a software provider may be able remotely to supply its customers with software upgrades by downloading the upgrade to the computer using a multicast transmission over telephone lines. If so programmed, the computer may send a response acknowledging receipt of the upgrade.

In the case of fax or e-mail messages, the recipient can be instructed to respond via fax, voice, or e-mail to a service bureau, which collects and processes the responses and returns them to the multicast message provider.

Applications For the Multicast Capability

A key advantage of integrating the multicast facility into existing communications networks is that it can be combined with other network facilities provided either to message providers or recipients.

Delivering A Multicast Message To A Wireless Service Subscriber

The multicast capability may be integrated with other network functions and services. Referring to FIG. 3, for example, if a recipient is a wireless communications user, such as a cellular telephone or Personal Communications Services (PCS) subscriber, the communications network contacts the appropriate databases to locate the wireless communications user. The SCP 308 may be used to locate the subscriber and obtain the appropriate routing information (using the HLR 324 and VLR 302 databases as described above). The wireless call is setup in the usual manner. The message is delivered to a SSP 314 connected to the appropriate MSC 318. The MSC sends the message to a base station 324 which broadcasts the message to the recipient. This may be done without setting up a separate PCS call to that subscriber, but during the multicast process itself, thus reducing the call setup time for delivering the message to that subscriber, and avoiding duplication of call processing.

Integrating Multicast With Personal Location Services

The multicast capability can be integrated with other advanced messaging services. For example, the multicast service can be used in conjunction with Bellcore's proprietary "Personal Location Service", disclosed in U.S. patent application Ser. No. 08/578,879, filed on Dec. 22, 1995. The contents of that patent application are incorporated herein by reference. Personal Location Service (PLS) is a value added personal location service for wireless communications system customers. PLS uses existing information in a wireless communication infrastructure to identify the cell or registration area in which a mobile terminal is currently located. In one example of the invention, a vehicle fleet is equipped with wireless terminals. A query processor connected to the wireless communication network receives a fleet dispatcher query. The query processor communicates with existing communications network components and databases, such as the HLR or VLR, to determine the location of the requested vehicle or person. Queries may be customized to suit a particular customer's unique needs, such as locating a particular terminal, all terminals in a particular area, all terminals associated with one or more particular attributes, or a combination of the above.

Integrating multicast capability with PLS allows the same message simultaneously to be sent to the selected subset of wireless terminals installed in vehicles by entering the message once, and then specifying the subset of terminals to be contacted based on their location and attributes as described above.

Integrating Multicast With Personal Communications Internetworking

The multicast capability can be used in conjunction with Bellcore's proprietary Personal Communications Internetworking (PCI). PCI is disclosed in U.S. patent application Ser. No. 08/309,336, filed on Sep. 19, 1994. The contents of that patent application are incorporated herein by reference. PCI provides a network subscriber with the ability to remotely control the receipt and delivery of wireless and wireline voice and text messages. The network operates as an interface between various wireless and wireline networks, and also performs media translation, where necessary. The subscriber's message receipt and delivery options are maintained in a database which the subscriber may access by wireless or wireline communications to update the options programmed in the database.

If a recipient of a multicast message is a PCS subscriber, the message may be routed to the appropriate phone number or mailbox specified in the PCI subscriber's profile. This is preferably done during processing of the multicast message to avoid duplicate call processing. This is, if the recipient list indicates that a recipient is a PCI subscriber, the IP will consult the recipient's profile to determine message routing preferences before placing the call to the recipient.

Integrating Multicast With "Do Not Disturb" Call Blocking

A recipient may have a communications network service which blocks incoming phone calls at certain times (say, from 10 pm to 6 am). If multicast is not integrated with this "Do Not Disturb" network service, a voice call to the recipient during those hours will be blocked and the recipient will not receive the message. The message provider then has the option of abandoning the call or periodically re-calling the recipient (in the conventional manner) until the call goes through.

This may be avoided by integrating multicast into the "do not disturb" service. The information stored in network databases (HLR, SCP, CPR) is obtained to determine that the recipient has a "Do Not Disturb" block activated, and appropriate action is taken so that the message is delivered when the block is deactivated. This may be done in several ways. For illustration, the implementations are described with the architecture of FIG. 3. It is apparent to those skilled in the art that these implementations may be used with the other architectures.

In a first implementation, when the message provider requests a message to be sent to a particular list of recipients' addresses, the SCP 308 checks its database to see if any of the recipients' addresses has a "Do Not Disturb" block on currently (or at the time the message is to be delivered, if different). If so, for each such address, the SCP creates a "future delivery record" containing the number, the time at which the block will be deactivated, and the message to be delivered, and transfers the record to the IP 306 to deliver the message at the times listed.

In a second implementation when a call is delivered to the recipient's SSP 314 (typically, the recipient's SSP queries the recipient's SCP—not seen in FIG. 3—for the "Do Not Disturb" handling instructions), the recipient's SCP consults the recipient's CPR and determines that blocking is in effect. At this stage, the recipient's SCP typically instructs the recipient's IP to play a message (i.e., "The party you are calling is not available, please call later") or to direct the message to a voice mail system. However, in this case, the SCP determines from one of the message provider's SCP/CPR/IP that the call is originating from a designated "multicast-capable IP". Having made this determination, the recipient's SCP either provides the message provider's IP 306 with the time at which the block will be deactivated for later delivery, or the recipient's IP stores the message and delivers it at that time.

Integrating Multicast With "Time of Day" Call Routing

A recipient may have a profile stored in a network database specifying that at various time intervals during the day, incoming calls are to be routed to different numbers (i.e., "From 5 pm to 6 am, incoming calls to my office fax machine should be directed to my home fax machine"). This may be a call forwarding service or a function provided by Bellcore's proprietary PCI service described in application Ser. No. 08/309,336, described above. Without integrating the multicast service into the communications network services, a message sent to that recipient would first be sent to the recipient's usual number, and then—following lookup of appropriate network databases—be redirected to the routing number specified in the recipient's user's profile. This slows down the message delivery and wastes network resources.

If multicast capability is integrated into the communications network services, when a message provider requests that a message be multicast to a list of recipients, the SCP 308 consults its own database tables to check if any of the recipients have call routing activated, and if so, substitute the recipient's usual number with the redirected number specified in the profile. This saves network resources and reduces call setup time.

Notice that several related services could be provided by this means also, e.g., to deliver an incoming text message via a different medium (fax, pager, or synthesized speech) or look up appropriate network databases (i.e., HLR and VLR databases) in order to more efficiently route the call to a recipient who is using cellular or PCS communications. This is achieved by looking at the appropriate network databases during the multicast process.

The above described embodiments of the invention are intended to be illustrative only. Numerous alternative embodiments may be devised by those skilled in the art without departing from the spirit and scope of the following claims.

APPENDIX

BS Base Station
CPR Call Processing Record
DTMF Dual Tone Multiple Frequency
HLR Home Location Register
IP Intelligent Peripheral
ISDN Integrated Signaling Digital Network
LSTP Local Signaling Transfer Point
MSC Mobile Switching Center
PC Personal Computer
PCI Personal Communications internetworking
PCS Personal Communications Services
PDA Personal Digital Assistant
PIN Personal Identification Number
PLS Personal Location Services
POTS Plain Old Telephone Service
PSTN Public Switched Telephone Network
RP Radio Port
RPCU Radio Port Control Unit
RSTP Regional Signaling Transfer Point
SCP Service Control Point
SSP Service Switching Point
TCAP Transaction Capabilities Application Part
VLR Visiting Location Register
WSC Wireless Switching Center

What is claimed is:

1. A method for transmitting the same message to a plurality of recipients in a telephone communications network having a plurality of call processing entities from a communications terminal connected to a first of said call processing entities while permitting said terminal to access the network, the method comprising the steps of:

in response to dial signals from said terminal, said first call processing entity consulting a network control element;

under control of said network control element, establishing a communication path from said first call processing entity to a second call processing entity;

forwarding the message to be transmitted to the plurality of recipients from said terminal to said second call processing entity over said communication path;

storing themessage to be transmitted at said second call processing entity; and utilizing a list of recipient numbers stored at said second call processing entitity, individually establishing the separate call connections from said second call processing entity to each of the plurality of recipients.

2. The method in accordance with claim 1 wherein said step of forwarding comprises transmitting said message over a communication facility other than normally used for transmission of speech between said first and second call processing entities.

3. The method in accordance with claim 1 further comprising the steps of:

storing at said second call processing entity the list of the phone numbers of the recipients of said message;

receiving from said recipients responses initiated by said recipients; and forwarding to said terminal from said second call processing entity one of said responses and information based on said responses.

4. A telephone communications network for transmitting the same message to a plurality of recipients from a single terminal, said network comprising a plurality of call processing entities, one of said call processing entities being connected to said terminal;

means for transmitting from said one call processing entity to another said call processing entity the message to be delivered to a plurality of recipients and for storing said message at said another call processing entity, said means including a network control element and a data base for controlling said one call processing entity and communications facilities between said one and said another call processing entity; and means at said another call processing entity, utilizing a list of recipients at said another call processing entity, for individually establishing connections to said recipients and for separately delivering said message stored at said another call processing entity to said recipients.

5. The telephone communications network in accordance with claim 4 wherein said means for transmitting said message from said one call processing entity to said another call processing entity comprises communications facilities other than normally used for transmission of speech between said entities.

6. The telephone communications network in accordance with claim 4 wherein said remote call processing entity includes a call record containing the telephone numbers of the recipients of the message and a response record for responses initiated by the recipients.

7. The telephone communications network in accordance with claim 4 further comprising means at said call processing entity for receiving responses initiated by said recipients and for returning to said single terminal one of said responses and information based on said responses.

* * * * *